United States Patent [19]
Yamashita et al.

[11] Patent Number: 5,913,387
[45] Date of Patent: Jun. 22, 1999

[54] BRAKE DEVICE

[75] Inventors: Kazuhisa Yamashita, Sakai; Daisuke Nago, Osaka, both of Japan

[73] Assignee: Shimano Inc., Osaka, Japan

[21] Appl. No.: 08/895,560

[22] Filed: Jul. 16, 1997

[51] Int. Cl.⁶ .................................................... B62L 1/06
[52] U.S. Cl. ....................................................... 188/24.21
[58] Field of Search ............................ 188/24.12, 24.11, 188/24.21, 24.22

[56] References Cited

U.S. PATENT DOCUMENTS

| 4,597,474 | 7/1986 | Nagano | 188/24.21 |
| 5,103,938 | 4/1992 | Yoshigai | 188/24.22 |
| 5,636,716 | 6/1997 | Sugimoto et al. | 188/24.22 |

FOREIGN PATENT DOCUMENTS

| 2254864 | 5/1997 | China . | |
| 9405645 | 5/1994 | Germany . | |
| 450429 | 7/1936 | United Kingdom . | |

*Primary Examiner*—Matthew C. Graham
*Attorney, Agent, or Firm*—Shinjyu Global Ip Counselors, LLP

[57] ABSTRACT

A bicycle brake device is disclosed for coupling onto either front or rear forks of a bicycle. The brake device is preferably has a pair of brake arms which are pivotally coupled to either the front or rear forks by a pair of mounting members. The mounting members are design to be installed on conventional mounting posts which can be attached to either a brake arch or directly to the fork. The brake arms have their pivot pins spaced upwardly and outwardly from the mounting posts brake arch or the fork to improve the braking force. Also, in a parallel push type of brake device, the position of the pivot pins increases the horizontal dimension of the linkage to reduce wobbling.

20 Claims, 10 Drawing Sheets

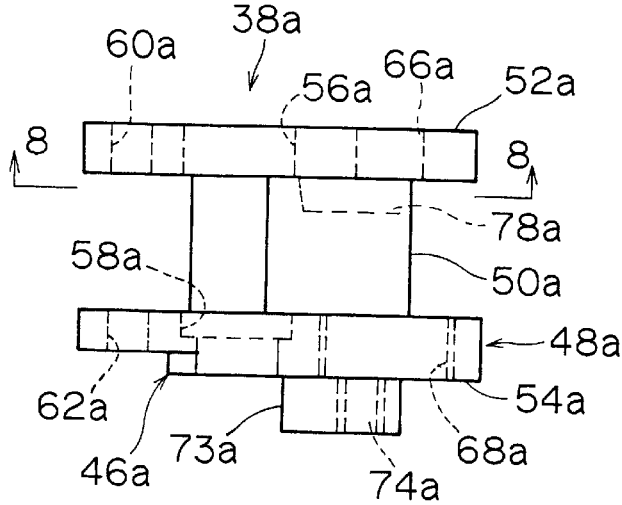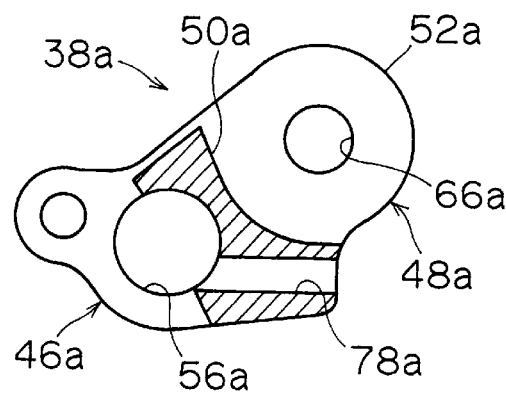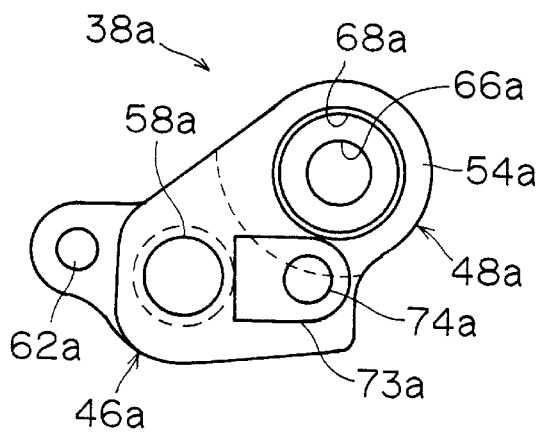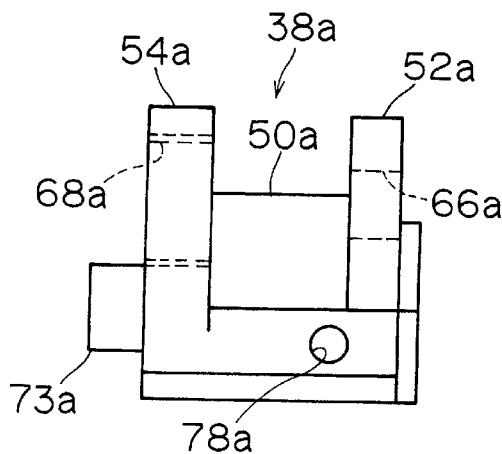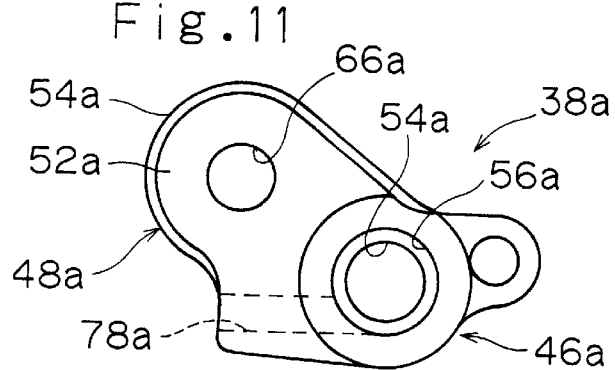

BRAKE DEVICE

FIELD OF THE INVENTION

The present invention generally relates to a brake device for bicycles and the like. More specifically, the present invention relates to a cantilever type bicycle brake device which can be mounted in a conventional manner to front or rear forks of a bicycle so that the brake shoes of the brake device are pressed against the rim of the corresponding wheel with more braking power upon actuation of a brake operating device.

BACKGROUND OF THE INVENTION

Bicycling is becoming an increasingly more popular form of recreation as well as a means of transportation. Moreover, bicycling has also become a very popular competitive sport for both amateurs and professionals. Whether the bicycle is used for recreation, transportation or competition, the bicycle industry is constantly improving the various components of the bicycle. One particular component of bicycles which has been extensively redesigned over the past years is the bicycle brake device. Bicycle brake devices are constantly being redesigned to provide additional braking power.

There are several types of bicycle brake devices which are currently available on the market. Examples of some types of common bicycle brake devices include rim brakes and caliper brakes. With respect to caliper brakes, there are mainly three types of caliper brakes: a side pull type, a center pull type and cantilever type. In a side pull type of caliper brake device, a pair of brake arms are pivotally connected together about a center mounting bolt which attaches to the frame of the bicycle. Each of the brake arms has a lever portion which is coupled to the brake wire such that when the rider operates the brake lever of the brake operating device, the lever portions of the brake arms are pulled together, which in turn move the brake shoes attached to the other ends of the brake arms together against the rim of the bicycle wheel. A return springs are provided for biasing the brake arms away from the bicycle wheel rim when the rider releases the brake lever. Side pull types of caliper brake devices are commonly used in road bikes.

A center pull type of caliper brake device operates similar to the side pull type, except that the brake arms are attached to a brake arm bridge such that each brake arm is pivotally coupled at a separate pivot point on the brake arm bridge. The brake arm bridge is attached directly to the frame of the bicycle. A straddle cable interconnects the two lever portions of the brake arms such that a main brake wire, which is coupled to the straddle wire, pulls the lever portions of the brake arms together.

A cantilever type of brake device is generally mounted on bicycle designs for off road use such as mountain bikes (MTB) and all terrain bikes (ATB). In particular, a cantilever type brake device is designed to provide a powerful braking force. A cantilever type of brake device is equipped with a pair of brake arms which are rotatably supported in a cantilever fashion on the front or rear fork of the bicycle frame, with the brake shoes attached to the upper portions of the brake arms. Typically, the lower ends of the brake arms are rotatably supported on the bicycle frame and the upper ends are linked to a brake cable or wire. The brake shoes are arranged opposite one another on either side of the bicycle wheel rim which is located between the arms. With this cantilever type of brake device, the bicycle arms rotate in the closing direction when the brake cable is pulled by the brake lever, which in turn results in the brake shoes being pressed against the rim to apply a braking force.

Cantilever types of brake devices have several advantages over side pull types of caliper brake devices. For example, with such a cantilever brake device, there is no need to vary the shape of the device with the size of the bicycle as may be the case with a side pull type caliper type brake device. Moreover, cantilever type of brake devices apply a more equal braking force than a side pull type caliper brake. Accordingly, the present invention is especially directed to improving the performance of cantilever type brakes.

In view of the above, there exists a need for a brake device which provides improved performance of cantilever type brakes such as increased braking force utilizing existing mounting posts and increased stability. This invention addresses these needs in the art as well as other needs in the art which will become apparent to those skilled in the art from this disclosure.

SUMMARY OF THE INVENTION

One object of the present invention is to provide a brake device which can be mounted to a conventional bicycle frame and has increased braking power.

Another object of the present invention is to provide a brake device which has the pivot points of the brake arms located upwardly and outwardly from the mounting posts of the bicycle frame.

Yet another object of the present invention is to provide a brake device with a parallel push mechanism which has a wider horizontal dimensioned linkage to reduce wobble.

Still another object of the present invention is to provide a brake device which is lightweight and relatively inexpensive to manufacture.

The foregoing objects can basically be attained by providing a brake device, comprising a first brake arm having a first end with a first pivot portion, a second end with a first cable connection, an inner side extending between the first and second ends of the first brake arm, an outer side extending between the first and second ends of the first brake arm and a first brake shoe attachment portion located adjacent the inner side of the first brake arm and between the first and second ends of the first brake arm; a second brake arm having a first end with a second pivot portion, a second end with a second cable connection, an inner side extending between the first and second ends of the second brake arm, an outer side extending between the first and second ends of the second brake arm and a second brake shoe attachment portion located adjacent the inner side of the second brake arm and between the first and second ends of the second brake arm; and a mounting assembly coupled to the first and second brake arms, the mounting assembly including a first mounting member having a first frame coupling section with a first coupling member and a first pivot section pivotally coupled to the first pivot portion of the first brake arm via a first pivot pin between a release position and a braking position, the first pivot pin being spaced from the first frame coupling section, the first coupling member being located adjacent the inner side of the first brake arm such that the first pivot pin is located upwardly and outwardly from the first coupling member; a second mounting member having a second frame coupling section with a second coupling member and a second pivot section pivotally coupled to the second pivot portion of the second brake arm via a second pivot pin between a release position and a braking position, the second pivot pin being spaced from the second frame coupling section, the second coupling member being located adjacent the inner side of the second brake arm such that the second pivot pin is located upwardly and outwardly from the second coupling member.

It will be apparent to those skilled in the art that the bicycle brake device in accordance with the present invention should not be limited to cantilever type brake devices illustrated herein. Rather, the bicycle brake device in accordance with the present invention can be utilized with other types of brake devices which has similar dynamics. Moreover, the bicycle brake device can be coupled to either the front or back forks of the bicycle as needed and/or desired. In addition, the present invention can be adapted for use with other types of brake arms other than the ones illustrated herein.

Other objects, advantages and salient features of the present invention will become apparent to those skilled in the art from the following detailed description, which, taken in conjunction with the annexed drawings, discloses two preferred embodiments of the present invention.

BRIEF DESCRIPTION OF THE DRAWINGS

Referring now to the attached drawings which form part of this original disclosure:

FIG. 7 is an enlarged top plan view of the right mounting member for the bicycle brake device illustrated in FIGS. 2–6;

FIG. 8 is an enlarged cross-sectional view of the right mounting member illustrated in FIG. 7 for the bicycle brake device illustrated in FIGS. 2–4 taken along section line 8—8 of FIG. 7;

FIG. 9 is an enlarged front elevational view of the right mounting member illustrated in FIGS. 7 and 8 for the bicycle brake device illustrated in FIGS. 2–4;

FIG. 10 is an enlarged right side elevational view of the right mounting member illustrated in FIGS. 7–9 for the bicycle brake device illustrated in FIGS. 2–4;

FIG. 11 is an enlarged rear elevational view of the right mounting member illustrated in FIGS. 7–11 for the bicycle brake device illustrated in FIGS. 2–4;

DETAILED DESCRIPTION OF THE PREFERRED EMBODIMENTS

Figure 1:
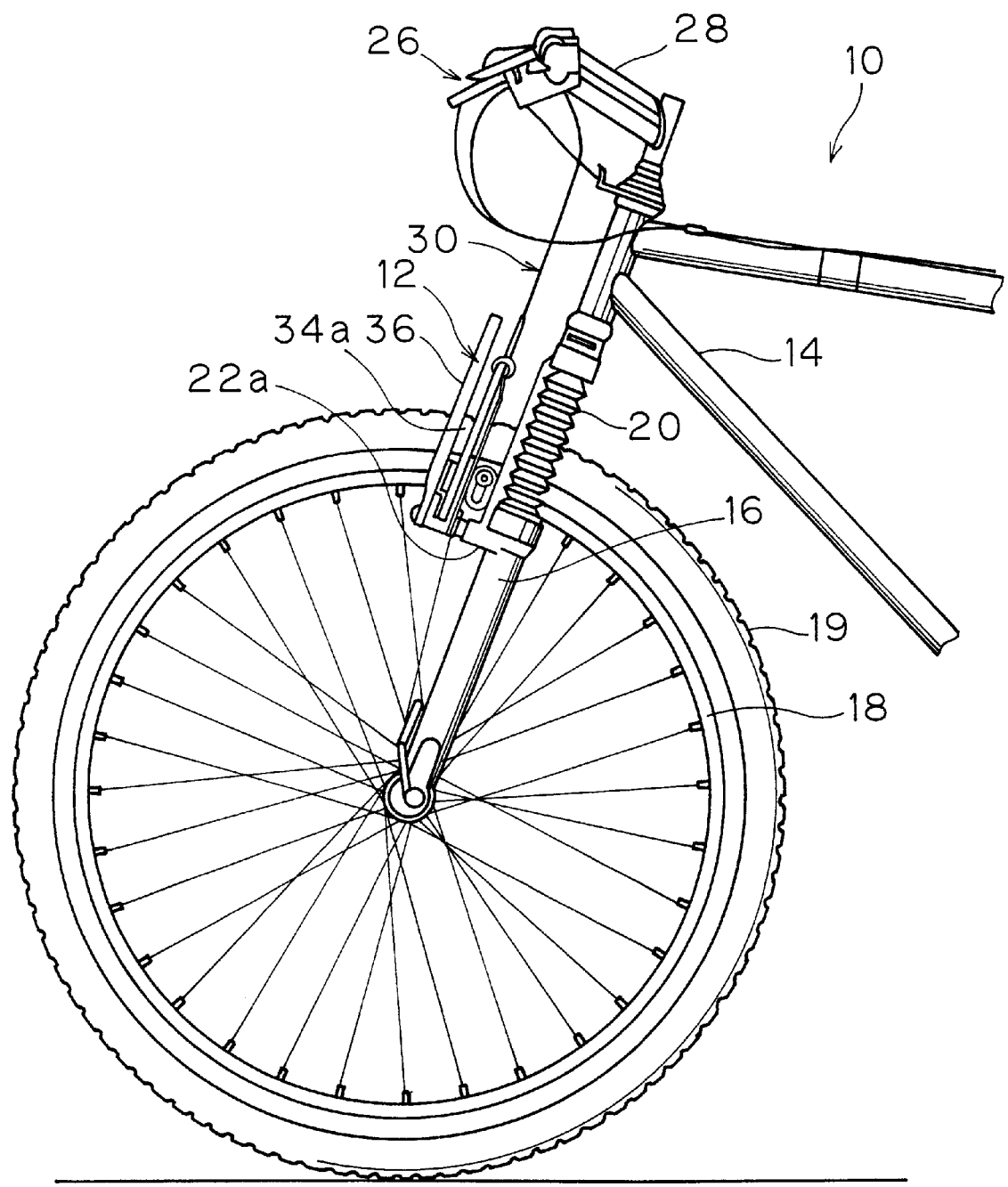
FIG. 1 is a partial, side elevational view of a conventional bicycle using a bicycle brake device in accordance with the present invention.

Referring initially to FIG. 1, a conventional bicycle 10 is illustrated having a bicycle brake device 12 fixedly coupled to the frame 14 of the bicycle 10 in accordance with a first embodiment of the present invention. Bicycle brake device 12 is coupled to front fork 16 and engages and applies a braking force against rim 18 of bicycle wheel 19. Brake device 12 has an increased braking force over prior art brake devices as discussed below.

Figure 3:
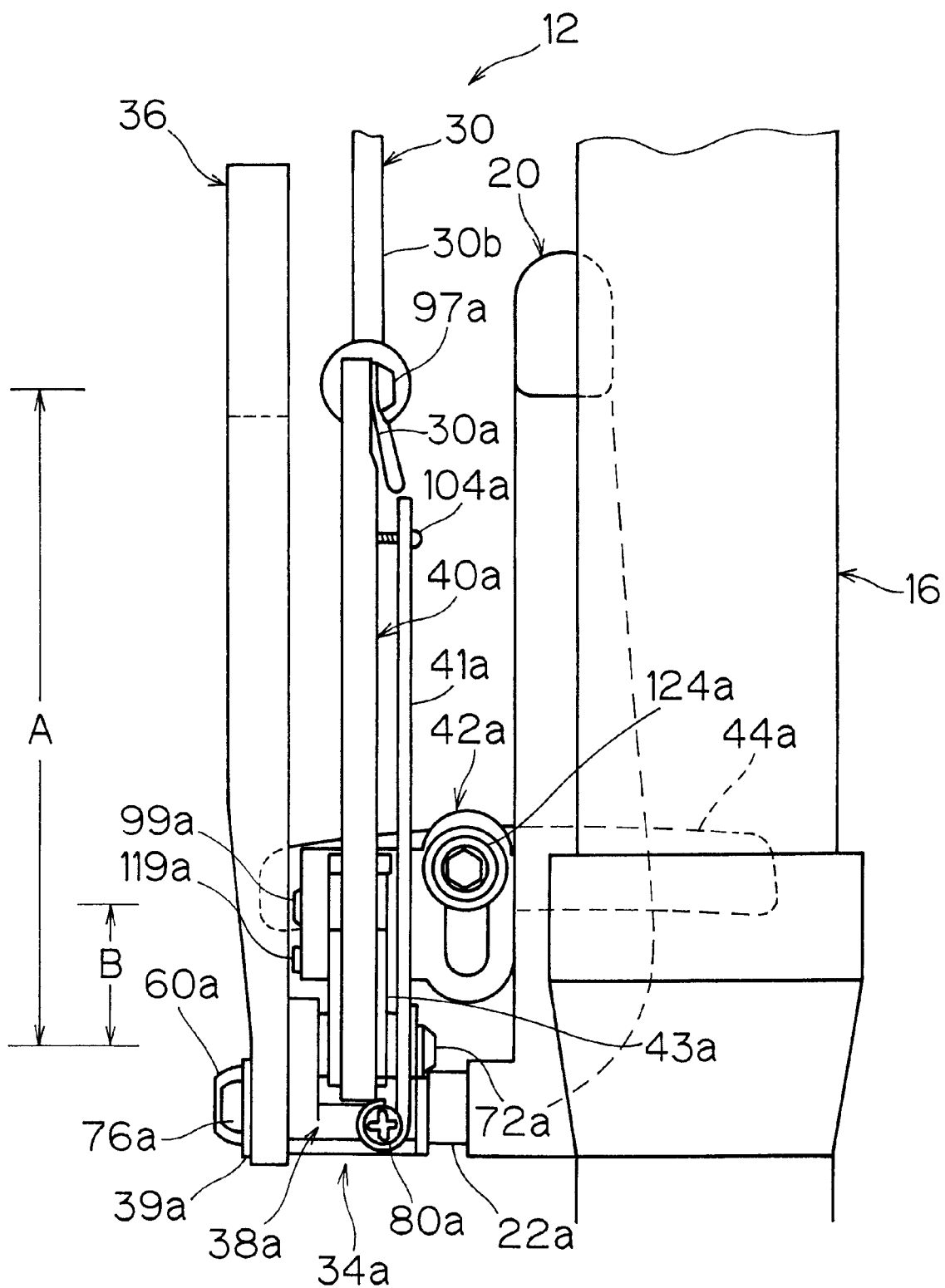
FIG. 3 is a right side elevational view of the bicycle brake device illustrated in FIG. 2 with the brake device coupled to the front fork of the bicycle which is diagrammatically illustrated.
Figure 6:
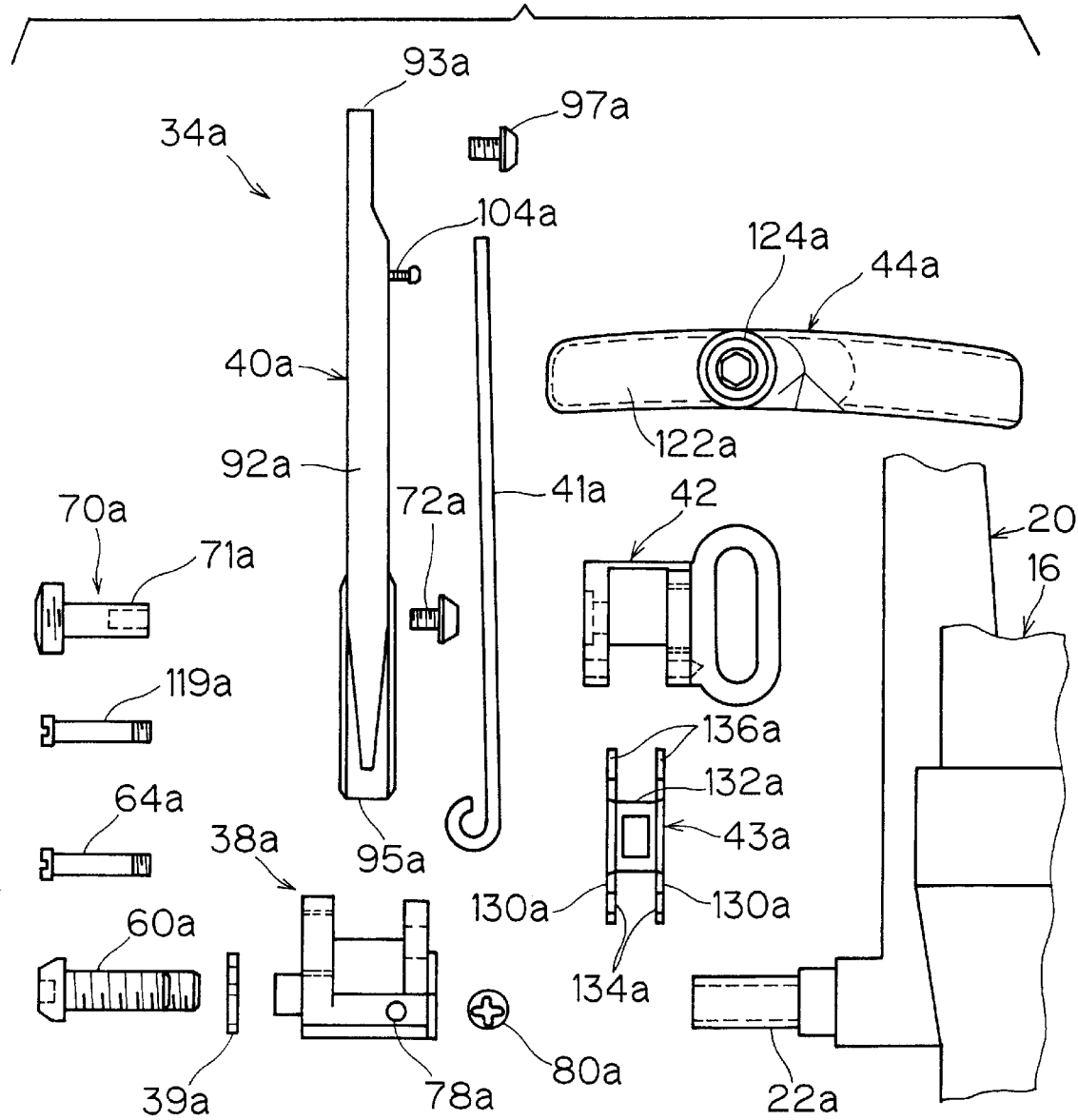
FIG. 6 is an exploded right side elevational view of selected parts of the right brake mechanism for the bicycle brake device illustrated in FIGS. 2–5.
Figure 12:
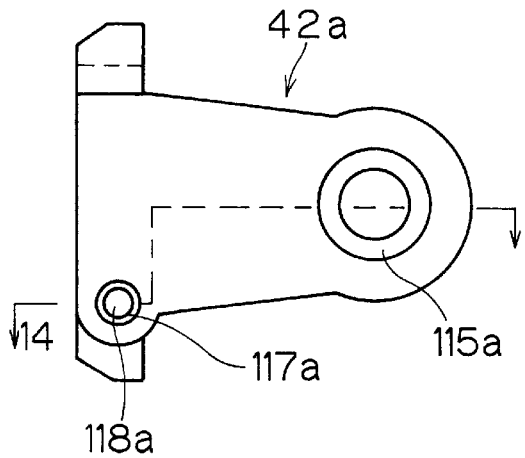
FIG. 12 is an enlarged front elevational view of the right bicycle brake shoe attachment portion for the bicycle brake device illustrated in FIGS. 2–4.
Figure 13:
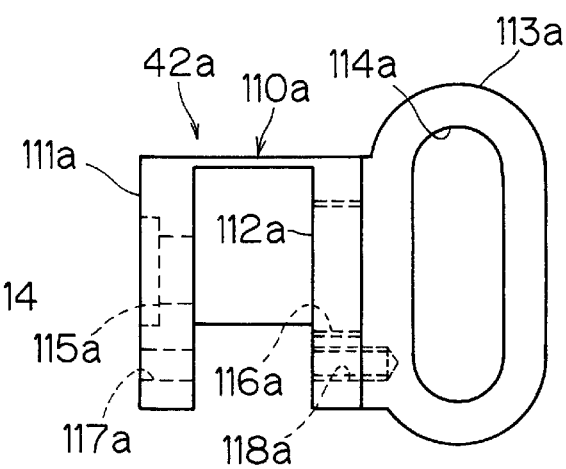
FIG. 13 is an enlarged right side elevational view of the right bicycle brake shoe attachment portion illustrated in FIG. 12 for the bicycle brake device illustrated in FIGS. 2–4.
Figure 14:
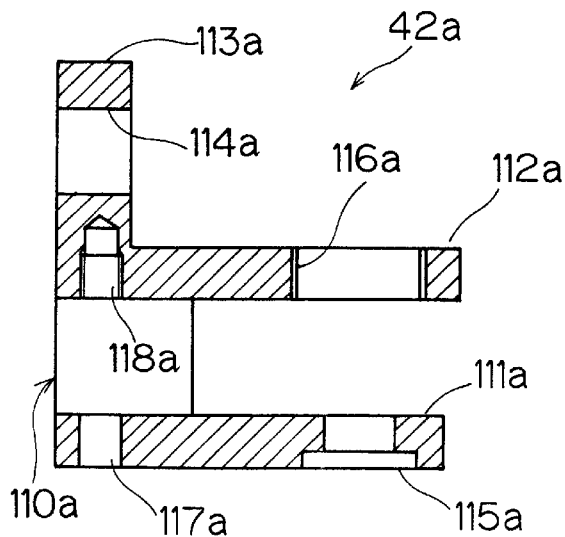
FIG. 14 is an enlarged cross-sectional view of the right bicycle brake shoe attachment portion illustrated in FIGS. 12 and 13 for the bicycle brake device illustrated in FIGS. 2–5, taken along section line 14—14 of FIG. 12.
Figure 15:
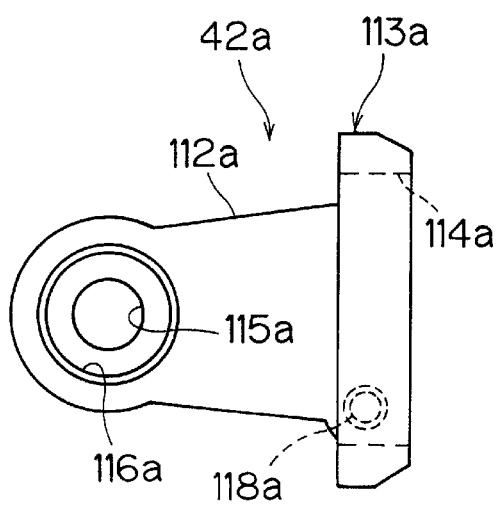
FIG. 15 is an enlarged rear elevational view of the right bicycle brake shoe attachment portion illustrated in FIGS. 12–14 for the bicycle brake device illustrated in FIGS. 2–5.

While bicycle brake device 12 is illustrated as being coupled to front fork 16 of bicycle frame 14, it will be apparent to those skilled in the art from this disclosure that bicycle brake device 12 can be coupled to the rear fork (not shown) of bicycle frame 14. In this particular embodiment, front fork 16 is illustrated as a suspension type fork for absorbing shocks from the road as seen in FIG. 1. For example, front fork 16 can be a conventional air/oil or elastomer type of suspension fork. As best seen in FIGS. 3 and 6, bicycle brake device 12 is fixedly coupled to front fork 16 of frame 14 via a brake arch 20. Referring specifically to FIGS. 1 and 3, brake arch or fixing member 20 is an inverted U-shaped member with a pair of leg portions. Brake arch or fixing member 20 is preferably integrally formed as a one-piece, unitary member from a suitable rigid material as is known within the art. Brake arch 20 is coupled to front fork 16 in a conventional manner. A pair of mounting posts or coupling members (only coupling member 22a is seen in the FIGS.) are formed on a brake arch 20, which in turn is fixedly coupled to fork 16. Of course, it will be apparent to those skilled in the art from this disclosure that in certain types of bicycles mounting posts can be coupled directly to mounting posts attached directly to the front forks, e.g., bicycles without front suspension forks.

Bicycle brake device 12 is operated in a substantially conventional manner by the rider via a conventional brake operating device or lever 26 which is mounted on the handle bar 28 of bicycle 10 in a conventional manner. Bicycles and their various components are well-known in the prior art, and thus, bicycle 10 and its various components such as brake operating device 26, will not be discussed or illustrated in detail herein.

Figure 4:
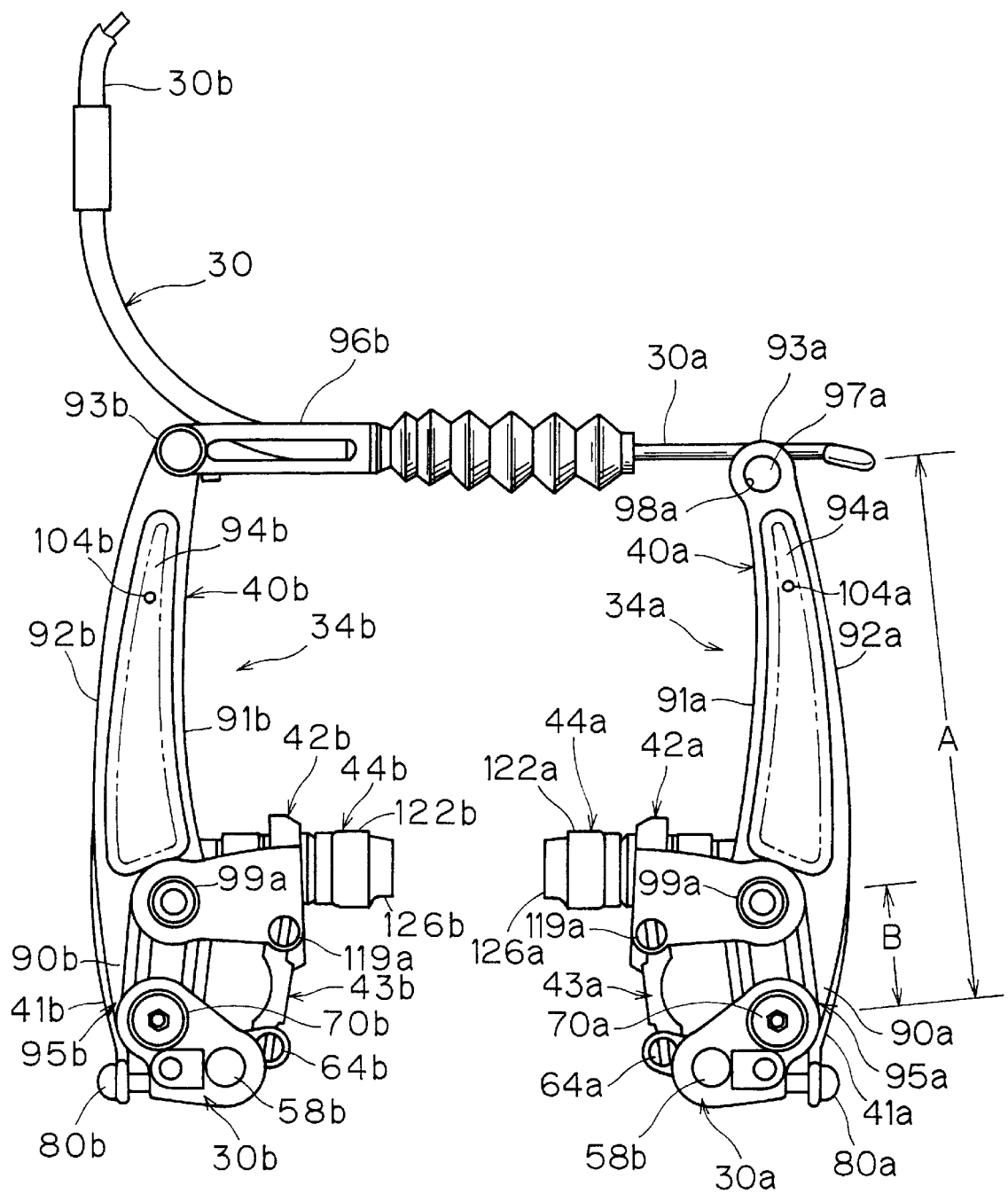
FIG. 4 is a front elevational view of the bicycle brake device illustrated in FIGS. 2 and 3 with the booster removed for purposes of illustration.

As best seen in FIGS. 1 and 4 taken together, brake device 12 is operatively coupled to brake operating device 26 via a brake cable 30 having an inner brake wire 30a and an outer casing 30b. Basically, the rider will operate the brake operating device 26 which in turn will cause brake device 12 to move inwardly for applying a braking force against rim 18 of bicycle wheel 19. Upon release of the brake operating device 26, brake device 12 will release rim 18 to allow bicycle wheel 19 to rotate.

As best seen in FIG. 4, brake device 12 basically includes a pair of brake mechanisms 34a and 34b which are substantially mirror images of each other, except for their connections to brake cable 30. Accordingly, as viewed looking at the front of bicycle 10, only the right brake mechanism 34a will be illustrated and described in detail herein. Optionally, a booster 36 is used to interconnect brake mechanisms 34a and 34b together as seen in FIGS. 2 and 3.

Figure 2:
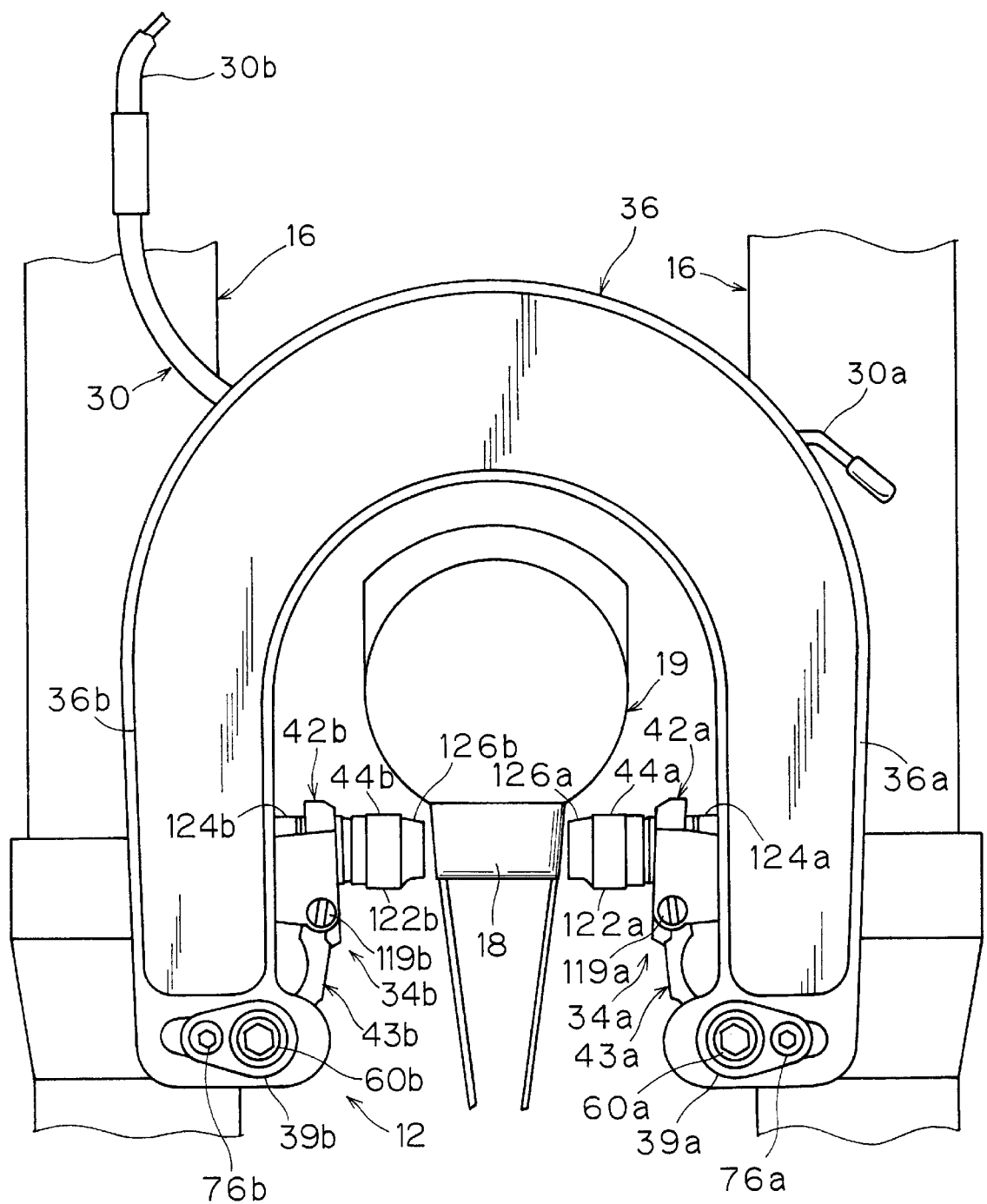
FIG. 2 is a front elevational view of the bicycle brake device in accordance with a first embodiment of the present invention with the brake device coupled to the front fork of the bicycle which is diagrammatically illustrated.

As best seen in FIGS. 2 and 4, right brake mechanism 34a basically includes a mounting member 38a, a booster attachment plate 39a, a brake arm 40a, a return spring 41a, a brake shoe attachment portion 42a, a link member 43a and a brake shoe 44a, while left brake mechanism 36b basically includes a mounting member 38b, a booster attachment plate 39b, a brake arm 40b, a return spring 41b, a brake shoe attachment portion 42b, a link member 43b and a brake shoe 44b. Mounting members 38a and 38b form a mounting assembly for fixedly coupling brake device 12 to brake arch 20 via mounting pins 22a and 22b.

Brake arms 40a and 40b are pivotally coupled to mounting members 38a and 38b, respectively. Return springs 41a and 41b are coupled between mounting members 38a and 38b and brake arms 40a and 40b, respectively, for pivoting brake arms 40a and 40b from braking positions to release positions. Shoe attachment portions 42a and 42b are pivotally coupled to brake arms 40a and 40b, respectively. Link members 43a and 43b are pivotally coupled to brake arms 40a and 40b at one end and to mounting members 38a and 38b at their other ends, respectively. Brake shoes 44a and 44b are fixedly coupled to shoes attachment portions 42a and 42b of brake arms 40a and 40b, respectively.

Referring to FIGS. 7–11, mounting member 38a is preferably a one-piece, unitary member constructed from a hard, rigid material. For example, mounting member 38a can be a lightweight metallic material such as aluminum, titanium, etc. Mounting member 38a has a frame coupling section 46a for coupling mounting member 38a to mounting post 22a and a pivot section 48a for pivotally coupling brake arm 40a thereto.

Figure 5:
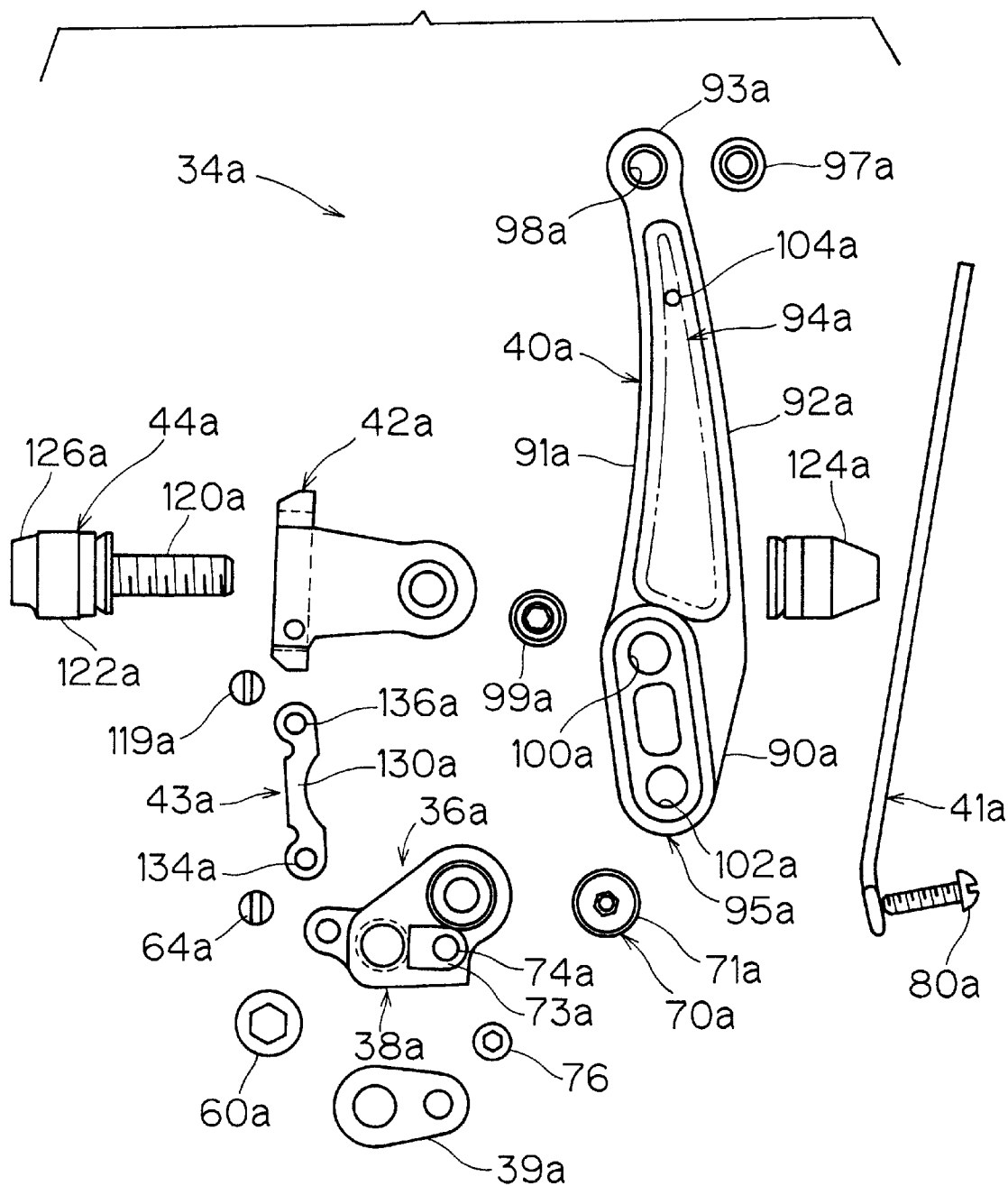
FIG. 5 is an exploded front elevational view of selected parts of the right brake mechanism for the bicycle brake device illustrated in FIGS. 2–4.

More specifically, mounting member 38a has a body portion 50a with a pair of parallel plates 52a and 54a coupled thereto. A pair of axially aligned bores 56a and 58a are formed in plates 52a and 54a, respectively, which form part of frame coupling section 46a for receiving mounting post 22a. A coupling member or fastener 60a is inserted through bores 56a and 58a to be received in the threaded bore of mounting post 22a to secure mounting member 38a to mounting post 22a as best seen in FIGS. 3, 5 and 6. Mounting member 38a is non-rotatably coupled to brake arch 20 via coupling member 60a.

Bore 56a has its diameter slightly larger than the diameter of mounting post 38a such that mounting post 38a is snugly fitted within bore 56a. Bore 58a, on the other hand, is stepped with a first portion sized slightly larger than the diameter of mounting post 38a to snugly receive mounting post 38a therein, and a second portion sized smaller than mounting post 38a but large enough to receive fastener 60a therethrough. While bores 56a and 58a are illustrated with round cross-sections, it will be apparent to those skilled in the art that bores 56a and 58a can have non-circular cross-sections. Preferably, coupling member 60a is a bolt which is threadedly received in mounting post 22a for securing mounting member 38a to brake arch 20. Of course, it will be apparent to those skilled in the art from this disclosure that mounting member 38a can be coupled directly to front fork 16 or to another intermediate mounting member and then to frame 14 of bicycle 10.

Plates 52a and 54a also have a pair of holes 60a and 62a extending therethrough for receiving a pin 64a to secure one end of link member 43a thereto. Accordingly, link member 43a is pivotally coupled at its lower end to mounting member 38a via pin 64a. Preferably, pin 64a is a bolt and hole 60a is threaded for fixedly coupling pin 64a to mounting member 38a.

The pivot section 48a is formed by a pair of holes 66a and 68a extending through plates 52a and 54a, respectively, for receiving a pivot pin 70a to pivotally couple brake arm 40a to mounting member 38a. As seen in FIG. 4, the pivot axis of the pivot pin 70a is located upwardly and outwardly from the coupling member 60a which fastens mounting member 38a to mounting post 18a. As seen in FIG. 6, pivot pin 70a is constructed of a first fastener 71a and a second fastener 72a. Fastener 71a has a threaded head portion and a shaft portion with an axially extending threaded bore which receives the threaded shaft of fastener 72a therein. Hole 66a is smaller in diameter than hole 68a for receiving the shaft of fastener 72a therethrough. Hole 66a, on the other hand, is larger and threaded to receive the head portion of fastener 71a.

The front plate 54a of mounting member 38a has a block 73a extending outwardly from its front face with a threaded hole 74a positioned therein. Likewise, mounting member 38b has a block 73b extending outwardly from its front face with a threaded hole 74b positioned therein. The threaded holes 74a and 74b are adapted to receive screws 76a and 76b as seen in FIG. 2 for mounting attachment plates 39a and 39b thereto for coupling arms 36a and 36b of booster 36 in a conventional manner.

As best seen in FIGS. 8 and 10, body portion 50a of mounting member 38a has a threaded bore 78a for receiving screw 80a therein. Screw 80a attaches the bottom end of return spring 41a to mounting member 38a, while the upper end of return spring 41a is coupled to brake arm 40a to bias brake arm 40a in a clockwise direction about pivot pin 70a.

Referring again to FIG. 4, brake arms 40a and 40b are preferably constructed of a suitable rigid material. For example, the brake arms can be casted or machined from any suitable material such as aluminum, titanium dense plastic, ceramic, acrylic, etc. Preferably, brake arms 40a and 40b are constructed of a lightweight material to minimize the weight of brake device 12. In particular, as best seen in FIGS. 4 and 5, brake arm 40a has a first or lower end 90a, an inner side 91a, an outer side 92a and a second or upper end 93a. Likewise, brake arm 40b has a first or lower end 90b, an inner side 91b, an outer side 92b and a second or upper end 93b as best seen in FIG. 4. Accordingly, brake arms 40a and 40b are substantially identical to each other, except that their upper ends 93a and 93b are slightly modified for accommodating conventional cable connections or wire mounting portions as seen in FIG. 4. In view of these similarities, only brake arm 40a will be discussed and illustrated in detail herein.

Brake arms 40a and 40b have upper portions 94a or 94b and lower portions 95a or 95b. Upper portion 94a of brake arm 40a is coupled to brake cable 30 via lock bolt 97a which is received into threaded hole 98a. Lock bolt 97a clamps brake wire 30a against upper portion 94a of brake arm 40a. The outer casing 30b of brake cable 30 is coupled to upper portion 94b of brake arm 40b. In particular, as best seen in FIG. 4, a connecting arm 96b is pivotally coupled to upper portion 94b of brake arm 40b and outer casing 30b of brake cable 30. Application of brake operating device 26 causes upper portions 94a and 94b to move inwardly towards each other.

The upper portions 94a and 94b of brake arms 40a and 40b have shoe attachment portions 42a and 42b pivotally coupled thereto. Of course, it will be apparent to those skilled in the art from this disclosure that shoe attachment portions 42a and 42b can be integrally formed with brake arms 40a and 40b for attaching brake shoes 44a and 44b thereto in a conventional manner as known in the art. Of course, other types of shoe attachment portions can be utilized as needed and/or desired. In this embodiment, brake arms 40a and 40b are provided with holes for pivotally coupling shoe attachment portions 42a and 42b thereto via pivot pins 99a and 99b. As in FIG. 5, brake arm 40a has a hole 100a for receiving pivot pin 99a therethrough. Likewise, brake arm 40b is provided with a similar hole (not shown) for receiving pivot pin 99b therethrough.

Lower portion 95a of brake arm 40a is pivotally coupled to mounting member 38a such that brake arm 40a can rotate about a pivot axis formed by pivot pin 70a. More specifically, the lower portion 95a of brake arm 40a has a pivot hole 102a formed therein as seen in FIG. 5 for receiving pivot pin 70a therethrough. Lower portion 95a of brake arm 40a fits between plates 52a and 54a such that the center of pivot hole 100a aligns with the centers of holes 66a and 68a for receiving pivot pin 70a therethrough.

Return spring or biasing member 41a is coupled at one end to mounting member 38a via a fastener or screw 80a and engaged with post or screw 104a of brake arm 40a as best seen in FIG. 3. Return spring 41a is designed to normally bias brake arm 40a in a clockwise direction as seen in FIGS. 2 and 4. Accordingly, brake arm 40a is biased by return spring 41a such that brake shoe 44a normally moves away from rim 18 of bicycle wheel 19.

Return spring or biasing member 41b is similarly designed to normally bias brake arm 40b to a release position. Specifically, brake arm 40b is biased by return spring 41b in a counter-clockwise direction as seen in FIGS. 2 and 4. Accordingly, brake arm 40b is biased by return spring 41b such that brake shoe 44b normally moves away from rim 18 of bicycle wheel 19.

As seen in FIGS. 12–15, brake shoe attachment portion 42a has a U-shaped section 110a with a pair of flanges 111a and 112a, and a flat section 113a with an elongated slot 114a formed therein. Section 110a is designed to receive a portion of brake arm 40a between its flanges 111a and 112a for pivotally coupling brake shoe attachment portion 42a to brake arm 40a. In particular, front flange 111a has a bore 115a formed therein which is stepped to receive the head of pivot pin 99a therein. Rear flange 112a has a threaded bore 116a which threadedly receives part of pivot pin 99a therein.

Front flange 111a and rear flange 112a both have additional bores 117a and 118a, respectively for receiving pin 119a therein. More specifically, bore 117a is sized to allow pin 119a to pass therethrough, while bore 118a is a threaded blind bore which threadedly receives pin 119a therein. Pin 119a pivotally couples the upper end of link member 43a to brake shoe attachment portion 42a. Link member 43a is preferably designed to fit between flanges 111a and 112a.

Brake shoe 44a is attached to shoe attachment portion 42a such that brake shoe 44a can be adjusted vertically to ensure proper engagement between brake shoe 44a and rim 18 of bicycle wheel 19. Brake shoe 44a has a shoe fastening pin 120a, a shoe holder 122a which is fastened to one end of the shoe fastening pin 120a, a nut 124a threadedly coupled to the free end of shoe fastening pin 120a and a friction pad 126a (constructed of a suitable friction material) which is attached to the shoe holder 122a as seen in FIG. 5.

Similarly, brake shoe 44b is attached to shoe attachment portion 42b such that brake shoe 44b can be adjusted vertically to ensure proper engagement between brake shoe 44b and rim 18 of bicycle wheel 19. Brake shoe 44b has a shoe fastening pin (not seen in the FIGS.), a shoe holder 122b which is fastened to the tip end of the shoe fastening pin, a nut 124b threadedly coupled to the free end of the shoe fastening pin and a friction pad 126b (constructed of a suitable friction material) which is attached to the shoe holder 122b as seen in FIG. 2.

Link member 43a as seen in FIGS. 4–6, has a somewhat U-shaped cross-section with a pair of connecting portions 130a connected together by a central portion 132a. Each of the connecting portions 130a has a hole 134a in its lower end and a hole 136a in its upper end for receiving the pins 64a and 119a, respectively, to couple mounting member 38a to brake shoe attachment portion 42a. More specifically, the first pin 64a is used to couple the lower end of link member 43a to mounting member 38a. Pin 119a is used to couple the upper end of control link member 43a to brake attachment portion 42a.

Link member 43a together with brake arm 40a, brake shoe attachment portion 42a and mounting member 48a forms a parallel push mechanism in the form of a parallelogram such that the brake shoe 44a moves in a substantially straight movement to engage the rim of the bicycle 10. This type of parallel push mechanism is disclosed in U.S. Pat. No. 5,636,716 to Sugimoto et al., the disclosure of which is hereby incorporated herein by reference.

Basically, the distance of the axis of pin 64a to the axis of the pin 119a is equal to the distance to the axis of the pivot pin 70a to the axis of the pin 99a. Also, the distance from the axis of pin 64a to the axis of pivot pin 70a is equal to the distance from the axis of pin 119a to the axis of the pin 99a. Specifically, these four pins 64a, 70a, 99a and 119a are arranged such that they form the apexes of a parallelogram and a linkage mechanism is formed therebetween.

The braking force of bicycle brake device 12, as well as other cantilever brake devices, is typically measured as an arch ratio which is equal to the distance A between the axis of the pivot pin 70a of the brake arm 40a and the connection to the brake cable 30 divided by the distance B between the axis of the attachment point of the brake shoe attachment portion 42a (pin 99a) to the brake arm 40a and the axis of the pivot pin 70a of the brake arm 40a. Brake device 12 has an increased braking force by decreasing the distance B between the brake shoe attachment portion and the axis of the pivot point of the brake arm, as discussed below. In the illustrated embodiment, it is possible to keep the distance B of the arch ratio below twenty-eight millimeters, i.e., the distance B of the arch ratio is approximately 23.5 millimeters. Prior art brake devices have arch ratios of twenty-eight millimeters and above.

In operation, when the rider operates the brake lever of the brake operating device 12, the inner wire of the brake cable is pulled within the outer casing of the brake cable so that the upper portions 94a and 94b of brake arms 40a and 40b are pulled inwardly. Thereafter, the friction pads 126a and 126b on the brake shoe holders or pad supports 122a or 122b are pressed against the side surfaces of rim 18, thus causing a braking action to be performed. In other words, brake arm 40a rotates in a counter clockwise direction about pivot pin 70a against the force of return spring 41a and brake arm 40b rotates in a clockwise direction about pivot pin 70b against the force of return spring 41b. Once the rider releases the brake lever of the brake operating device 26, the brake wire 30a of the brake cable 30 is relaxed so that the return springs 41a and 42b cause the brake arms 40a and 40b to pivot in their opening directions. As a result, the tip ends of the friction pads 126a and 126b on the brake shoe holders 122a and 122b are withdrawn from the side surfaces of rim 18 so that the braking action is released.

SECOND EMBODIMENT

Figure 16:
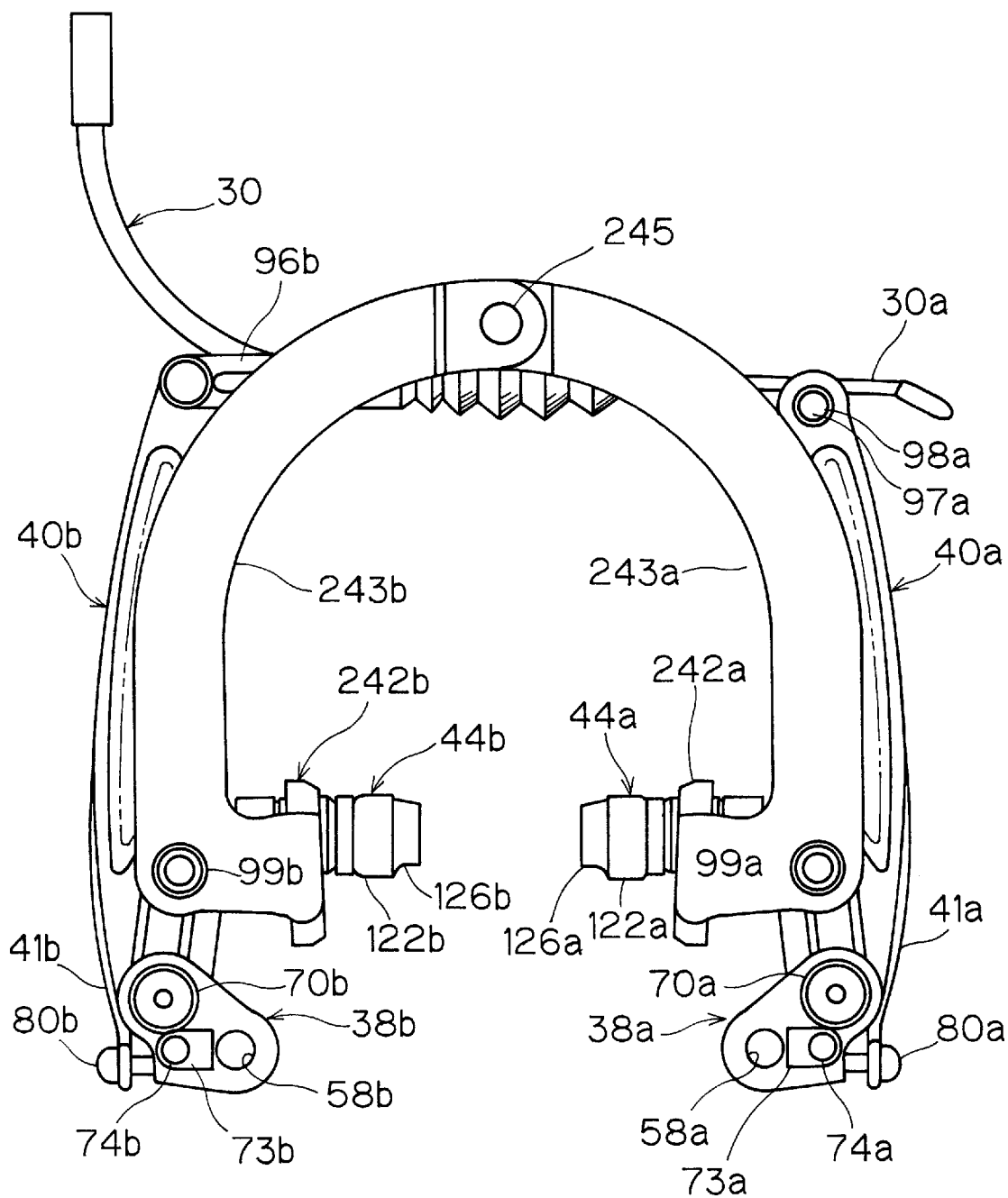
FIG. 16 is a front elevational view of the bicycle brake device in accordance with a second embodiment of the present invention.
Figure 17:
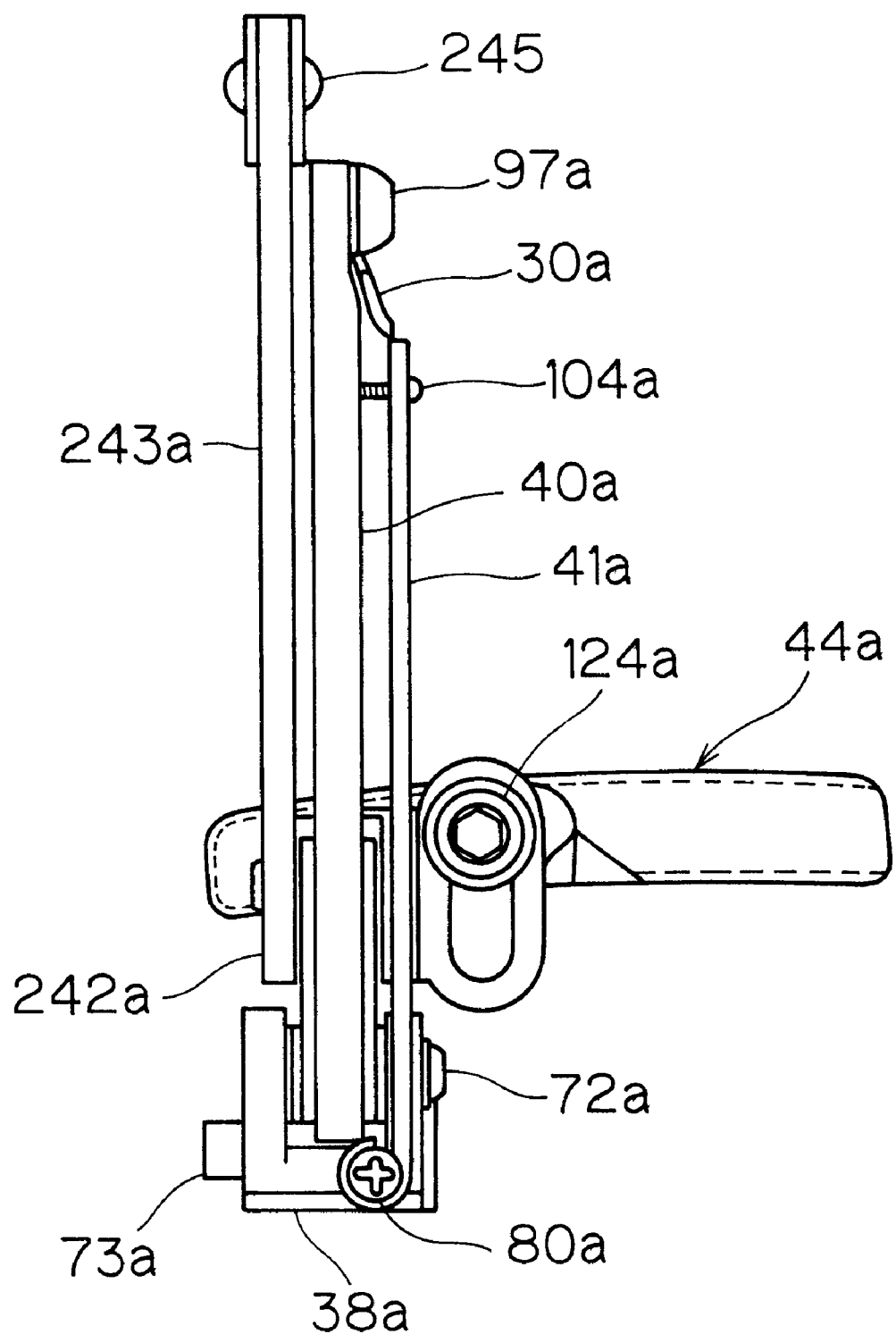
FIG. 17 is a left side elevational view of the bicycle brake device illustrated in FIG. 16.

Referring now to FIGS. 16 and 17, a brake device 212 is illustrated in accordance with a second embodiment of the present invention. This second embodiment differs from the first embodiment in that instead of utilizing a four bar linkage mechanism to control the movement of the brake pads, a three bar type linkage mechanism is utilized. In view of these similarities between the two embodiments, only the main differences between the first and second embodiments will be discussed and illustrated herein. Moreover, since the second embodiment utilizes many of the same parts of the first embodiment, these parts will be given the same reference numeral.

As seen in FIGS. 16 and 17, a pair of link portions 243a and 243b are integrally formed with brake shoe attachment portions 242a and 242b, respectively. The upper ends of link portions 243a and 243b are interconnected by a pivot pin 245 to control the movement of the brake shoes. While control link portion 243a and 243b are illustrated as being a one-piece, unitary member with brake shoe attachment portions 242a and 242b, respectively, it will be apparent to those skilled in the art from this disclosure that these parts can be made separately as in the first embodiment. More specifically, the bottom ends of link portions 243a and 243b can be releasably coupled to brake shoe attachment portions 242a and 242b, respectively by fastening means such as bolts. For example, the lower ends of link portions 243a and 243b could be coupled via the pivot pins.

The remaining parts of brake device 210 are substantially identical to brake device 10, discussed above, and can be coupled to the brake arch 20 and the booster 36 as discussed above.

While only two embodiments of the present invention has been described and illustrated herein, it will be apparent to those skilled in the art once given this disclosure that various modifications, changes, improvements and variations may be made without departing from the spirit or scope of this invention as defined in the following claims.

What is claimed is:

1. A brake device, comprising:
    a first brake arm having a first end with a first pivot portion, a second end with a first cable connection, an inner side extending between said first and second ends of said first brake arm, an outer side extending between said first and second ends of said first brake arm and a first brake shoe attachment portion located adjacent said inner side of said first brake arm and between said first and second ends of said first brake arm;
    a second brake arm having a first end with a second pivot portion, a second end with a second cable connection, an inner side extending between said first and second ends of said second brake arm, an outer side extending between said first and second ends of said second brake arm and a second brake shoe attachment portion located adjacent said inner side of said second brake arm and between said first and second ends of said second brake arm; and
    a mounting assembly coupled to said first and second brake arms, said mounting assembly including
        a first mounting member having a first frame coupling section and a first pivot section, said first frame coupling section having a first coupling member adapted to secure said first mounting member to a first frame member, said first pivot section being pivotally coupled to said first pivot portion of said first brake arm via a first pivot pin between a release position and a braking position, said first pivot pin being spaced from said first frame coupling section, said first coupling member being located adjacent said inner side of said first brake arm such that said first pivot pin is located upwardly and outwardly from said first coupling member; and
        a second mounting member having a second frame coupling section and a second pivot section, said second frame coupling section having a second coupling member adapted to secure said second mounting member to a second frame member, said second pivot section being pivotally coupled to said second pivot portion of said second brake arm via a second pivot pin between a release position and a braking position, said second pivot pin being spaced from said second frame coupling section, said second coupling member being located adjacent said inner side of said second brake arm such that said second pivot pin is located upwardly and outwardly from said second coupling member.

2. A brake device according to claim 1, wherein said first and second brake shoe attachment portions are coupled to said first and second brake arms by first and second attachment pins, respectively.

3. A brake device according to claim 1, further comprising first and second attachment pins pivotally coupling said first and second brake shoe attachment portions to said first and second brake arms, respectively, and
first and second parallel push mechanisms coupled to said first and second brake shoe attachment portions, respectively.

4. A brake device according to claim 1, wherein said first and second brake arms having a length A between their respective said first and second pivot sections and said first and second cable connections, and said first and second brake shoe attachment portions are spaced from said first and second pivot sections by a length B, with B being below 28 millimeters.

5. A brake device according to claim 1, wherein said mounting assembly includes a U-shaped booster having first and second free ends with first and second mounting holes, said first free end is coupled to said first mounting member via said first mounting hole and said second free end is coupled to said second mounting member via said second mounting hole.

6. A brake device according to claim 1, wherein said first and second frame coupling sections include first and second bores for receiving the first and second coupling members, respectively.

7. A brake device according to claim 6, wherein said mounting assembly further comprises a U-shaped booster having first and second free ends with first and second mounting holes, said first free end is coupled to said first bore of said first mounting member via said first coupling member extending through said first bore and said first mounting hole, and said second free end is coupled to said second bore of said second mounting member via said second coupling member extending through said second bore and said second mounting hole.

8. A brake device according to claim 1, wherein
a biasing member operatively coupled between each of said first and second brake arms and each of said first and second mounting members, respectively.

9. A brake device according to claim 8, wherein
each of said biasing members includes a return spring.

10. A brake device according to claim 1, wherein
a brake shoe is coupled to each of said first and second brake shoe attachment portions.

11. A brake device, comprising:
a first brake arm having a first end with a first pivot portion, a second end with a first cable connection, an inner side extending between said first and second ends of said first brake arm, an outer side extending between said first and second ends of said first brake arm and a first brake shoe attachment portion located adjacent said inner side of said first brake arm and between said first and second ends of said first brake arm;

a second brake arm having a first end with a second pivot portion, a second end with a second cable connection, an inner side extending between said first and second ends of said second brake arm, an outer side extending between said first and second ends of said second brake arm and a second brake shoe attachment portion located adjacent said inner side of said second brake arm and between said first and second ends of said second brake arm;

a mounting assembly coupled to said first and second brake arms, said mounting assembly including
    a first mounting member having a first frame coupling section with a first coupling member and a first pivot section pivotally coupled to said first pivot portion of said first brake arm via a first pivot pin between a release position and a braking position, said first pivot pin being spaced from said first frame coupling section, said first coupling member being located adjacent said inner side of said first brake arm such that said first pivot pin is located upwardly and outwardly from said first coupling member; and
    a second mounting member having a second frame coupling section with a second coupling member and a second pivot section pivotally coupled to said second pivot portion of said second brake arm via a second pivot pin between a release position and a braking position, said second pivot pin being spaced from said second frame coupling section, said second coupling member being located adjacent said inner side of said second brake arm such that said second pivot pin is located upwardly and outwardly from said second coupling member, first and second attachment pins pivotally coupling said first and second brake shoe attachment portions to said first and second brake arms, respectively; and first and second parallel push mechanisms coupled to said first and second brake shoe attachment portions, respectively, said first parallel push mechanism including a first link member pivotally coupled at its first end to said first brake shoe attachment portion and pivotally coupled at its second end to said first mounting member, and said second parallel push mechanism including a second link member pivotally coupled at its first end to said second brake shoe attachment portion and pivotally coupled at its second end to said second mounting member.

12. A brake device, comprising:
a first brake arm having a first end with a first pivot portion, a second end with a first cable connection, an inner side extending between said first and second ends of said first brake arm, an outer side extending between said first and second ends of said first brake arm and a first brake shoe attachment portion located adjacent said inner side of said first brake arm and between said first and second ends of said first brake arm;

a second brake arm having a first end with a second pivot portion, a second end with a second cable connection, an inner side extending between said first and second ends of said second brake arm, an outer side extending between said first and second ends of said second brake arm and a second brake shoe attachment portion located adjacent said inner side of said second brake arm and between said first and second ends of said second brake arm;

a mounting assembly coupled to said first and second brake arms, said mounting assembly including
    a first mounting member having a first frame coupling section with a first coupling member and a first pivot section pivotally coupled to said first pivot portion of said first brake arm via a first pivot pin between a release position and a braking position, said first pivot pin being spaced from said first frame coupling section, said first coupling member being located adjacent said inner side of said first brake arm such that said first pivot pin is located upwardly and outwardly from said first coupling member; and
    a second mounting member having a second frame coupling section with a second coupling member and a second pivot section pivotally coupled to said second pivot portion of said second brake arm via a second pivot pin between a release position and a braking position, said second pivot pin being spaced from said second frame coupling section, said second coupling member being located adjacent said inner side of said second brake arm such that said second pivot pin is located upwardly and outwardly from said second coupling member, first and second attachment pins pivotally coupling said first and second brake shoe attachment portions to said first and second brake arms, respectively; and first and second parallel push mechanisms coupled to said first and second brake shoe attachment portions, respectively, said first and second parallel push mechanisms including first and second link members, with said first link member fixedly coupled at its first end to said first brake shoe attachment portion and said second link member fixedly coupled at its first end to said second brake shoe attachment portion, said first and second link members having second ends pivotally coupled together.

13. A brake device according to claim 12, wherein
said first end of said first link member is non-separably coupled to a part of said first brake shoe attachment portion, and said first end of said second link member is non-separably coupled to said second brake shoe attachment portion.

14. A brake device, comprising:
a first brake arm having a first end with a first pivot portion, a second end with a first cable connection and a first brake shoe attachment portion located between said first and second ends of said first brake arm;

a first mounting member having a first frame section and a first pivot section, said first frame coupling section having a first coupling member adapted to secure said first mounting member to a first frame member, said first pivot section being pivotally coupled to said first pivot portion of said first brake arm via a first pivot pin between a release position spaced from a rim of a wheel and a braking position engaged with the rim of the wheel, said first pivot pin being spaced farther from the rim than said first frame coupling section;

a second brake arm having a first end with a second pivot portion, a second end with a second cable connection and a second brake shoe attachment portion located between said first and second ends of said second brake arm; and a second mounting member having a second frame coupling section and a second pivot section, said second frame coupling section having a second coupling member adapted to secure said second mounting member to a second frame member, said second pivot section being pivotally coupled to said second pivot portion of said second brake arm via a second pivot pin between a release position spaced from the rim of the wheel and a braking position engaged with the rim of the wheel, said second pivot pin being spaced farther from the rim than said second frame coupling section.

15. A brake device according to claim 14, wherein said first and second brake shoe attachment portions are coupled to said first and second brake arms by first and second attachment pins, respectively.

16. A brake device according to claim 14, further comprising first and second attachment pins pivotally coupling said first and second brake shoe attachment portions to said first and second brake arms, respectively, and first and second parallel push mechanisms coupled to said first and second brake shoe attachment portions, respectively.

17. A brake device according to claim 14, wherein said first and second brake arms having a length A between their respective said first and second pivot sections and said first and second cable connections, and said first and second brake shoe attachment portions are spaced from said first and second pivot sections by a length B, with B being below 28 millimeters.

18. A brake device according to claim 16, wherein said first parallel push mechanism includes a first link member pivotally coupled at its first end to said first brake shoe attachment portion and pivotally coupled at its second end to said first mounting member, and said second parallel push mechanism includes a second link member pivotally coupled at its first end to said second brake shoe attachment portion and pivotally coupled at its second end to said second mounting member.

19. A brake device according to claim 16, wherein said first and second parallel push mechanisms includes first and second link members, with said first link member fixedly coupled at its first end to said first brake shoe attachment portion and said second link member fixedly coupled at its first end to said second brake shoe attachment portion, said first and second link members having second ends pivotally coupled together.

20. A brake device according to claim 14, further comprising a U-shaped booster having first and second free ends with first and second mounting holes, said first free end is coupled to said first mounting member via said first mounting hole and said second free end is coupled to said second mounting member via said second mounting hole.

* * * * *